US011855358B2

(12) United States Patent
Dai et al.

(10) Patent No.: US 11,855,358 B2
(45) Date of Patent: *Dec. 26, 2023

(54) PLANAR ANTENNA

(71) Applicant: Flex Ltd., Singapore (SG)

(72) Inventors: Minghui Dai, Shanghai (CN);
Jiangsong Zhang, Shanghai (CN);
Xiao Sun, Shanghai (CN)

(73) Assignee: Flex, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,346

(22) Filed: May 25, 2022

(65) Prior Publication Data
US 2022/0285856 A1 Sep. 8, 2022

Related U.S. Application Data

(63) Continuation of application No. 16/290,568, filed on Mar. 1, 2019, now Pat. No. 11,355,865.

(30) Foreign Application Priority Data

Jan. 8, 2018 (CN) .......................... 201810016135.5

(51) Int. Cl.
*H01Q 21/24* (2006.01)
*H01Q 9/04* (2006.01)
*H01Q 7/00* (2006.01)
*H01Q 1/38* (2006.01)
*H04B 5/00* (2006.01)
*H01F 27/36* (2006.01)

(52) U.S. Cl.
CPC .......... *H01Q 21/24* (2013.01); *H01F 27/366* (2020.08); *H01Q 1/38* (2013.01); *H01Q 7/00* (2013.01); *H01Q 9/0407* (2013.01); *H04B 5/0081* (2013.01)

(58) Field of Classification Search
CPC ........ H01Q 21/24; H01Q 9/0407; H01Q 7/00; H01Q 1/38; H01Q 1/50; H04B 5/0081; H04B 5/0037; H02J 50/005; H02J 50/10; H02J 50/70; H01F 2027/2809; H01F 27/2804; H01F 27/2871; H01F 27/36; H01F 38/14
See application file for complete search history.

(56) References Cited

U.S. PATENT DOCUMENTS

| | | | |
|---|---|---|---|
| 11,355,865 B2* | 6/2022 | Dai | .............. H01F 27/2871 |
| 2012/0154101 A1 | 6/2012 | Miyashita et al. | |
| 2014/0306656 A1 | 10/2014 | Tabata et al. | |
| 2015/0028987 A1 | 1/2015 | Barry et al. | |
| 2015/0077208 A1 | 3/2015 | Goldman et al. | |
| 2017/0307964 A1* | 10/2017 | Okamoto | ................ H02J 50/10 |
| 2017/0365915 A1 | 12/2017 | Cho et al. | |
| 2018/0204672 A1 | 7/2018 | Mendoza | |

(Continued)

*Primary Examiner* — Renan Luque
(74) *Attorney, Agent, or Firm* — Sheridan Ross P.C.

(57) ABSTRACT

A planar antenna can include one or more high permeability objects that are added near the planar coil's tips. Further, the planar antenna includes a coil having two or more layers, with each layer having two or more turns. The planar antenna also has a restricted conductor arrangement, where there are a maximum number of turns arranged in any horizontal layer. A turn's conductor could be a single conductor or could be two (2) or more conductors arranged in parallel.

20 Claims, 14 Drawing Sheets

(56) References Cited

U.S. PATENT DOCUMENTS

2018/0358168 A1* 12/2018 Furiya .................... H01F 27/24
2018/0358174 A1   12/2018 Komachi et al.
2019/0100107 A1*  4/2019 Islinger ................. H01F 38/14

* cited by examiner

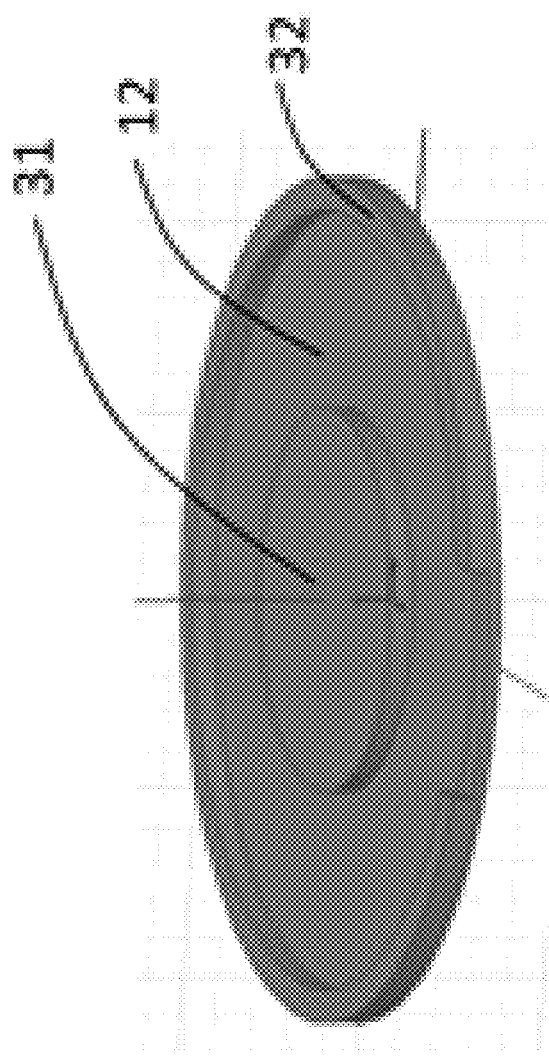
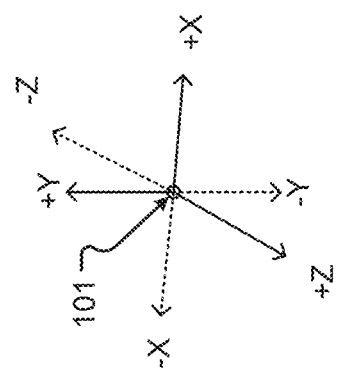
Fig. 2B

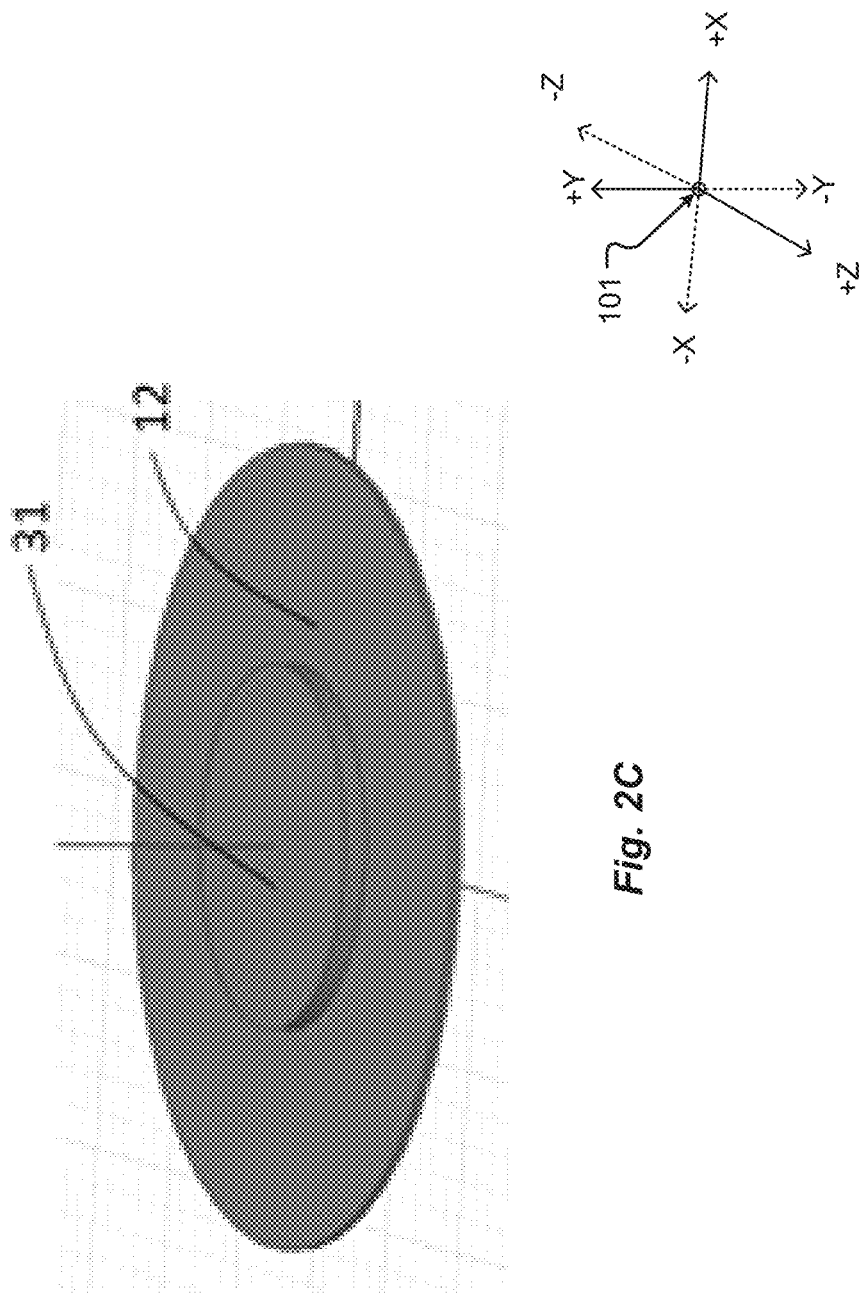

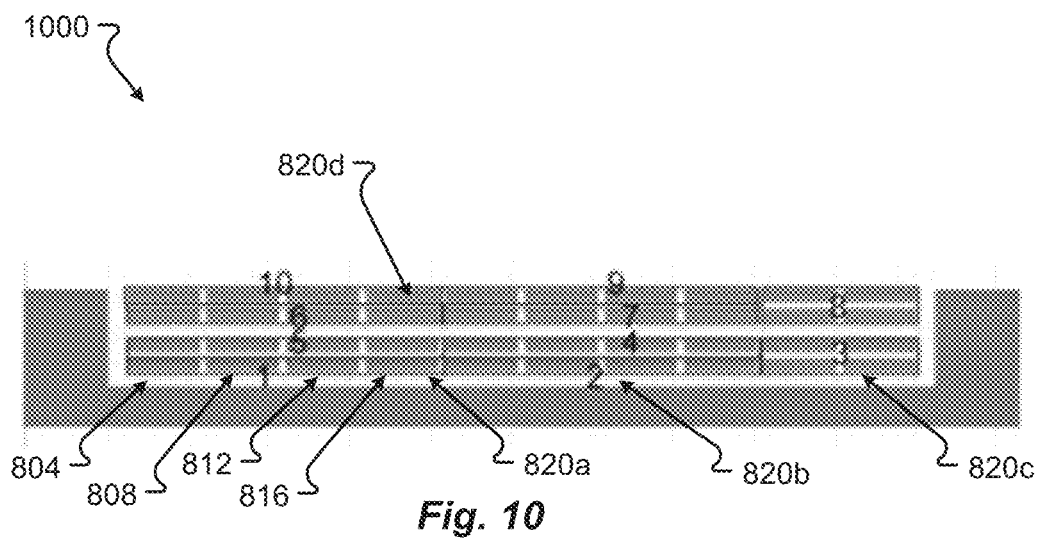
Fig. 10
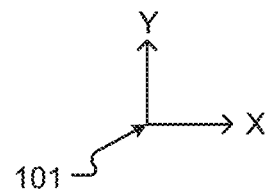
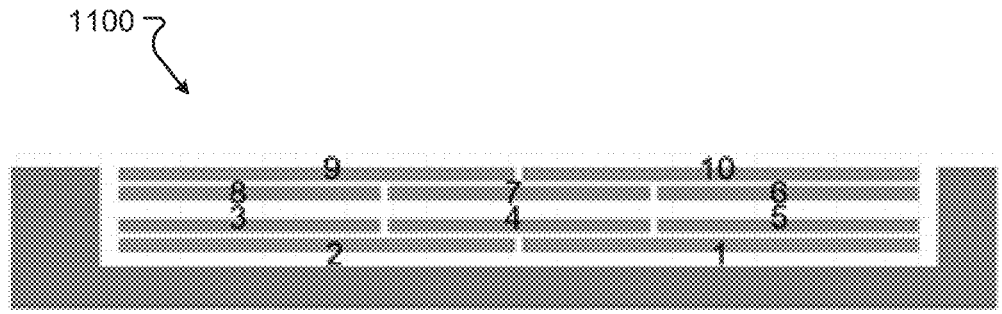
Fig. 11

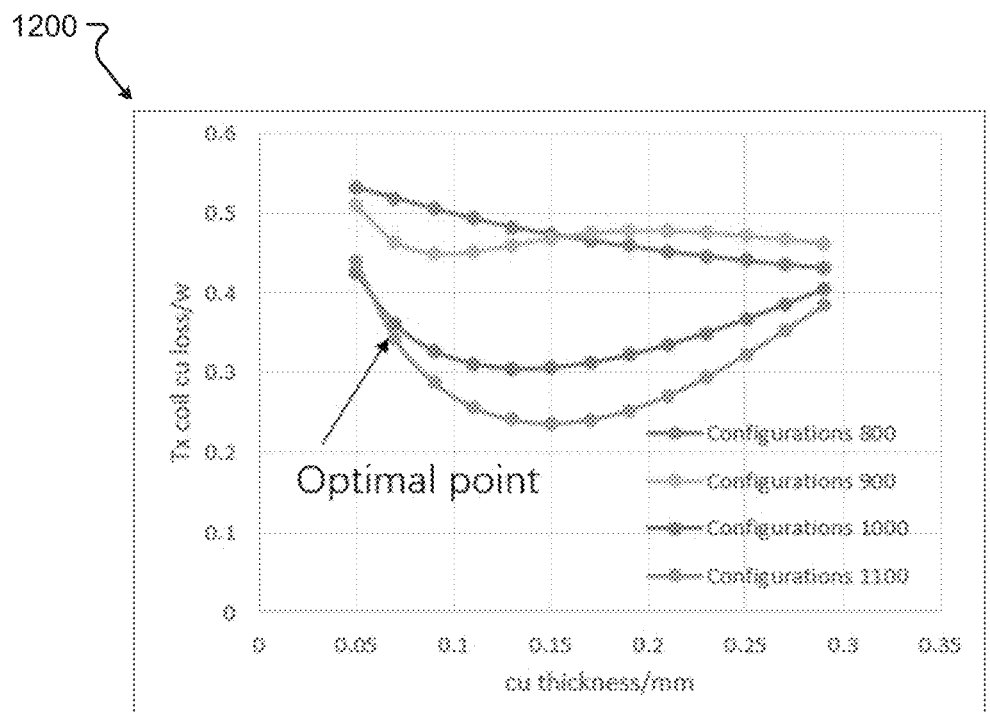
*Fig. 12*
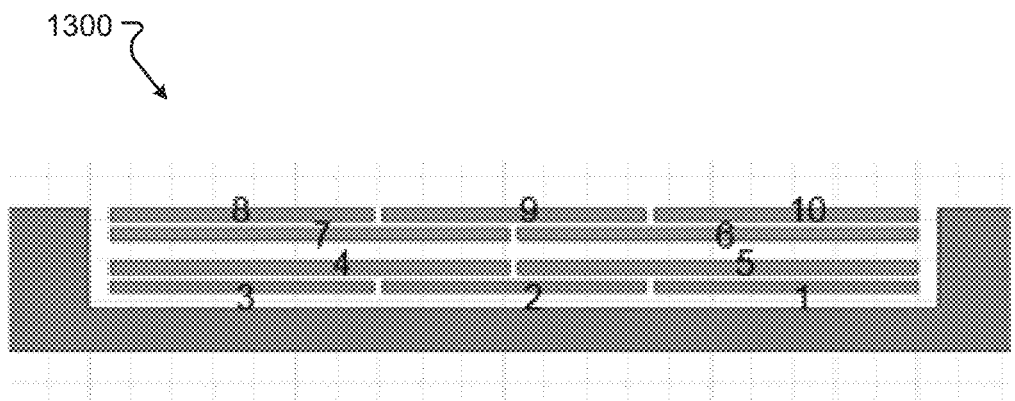
*Fig. 13*
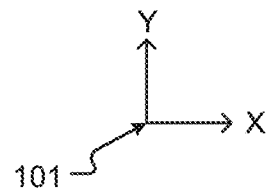

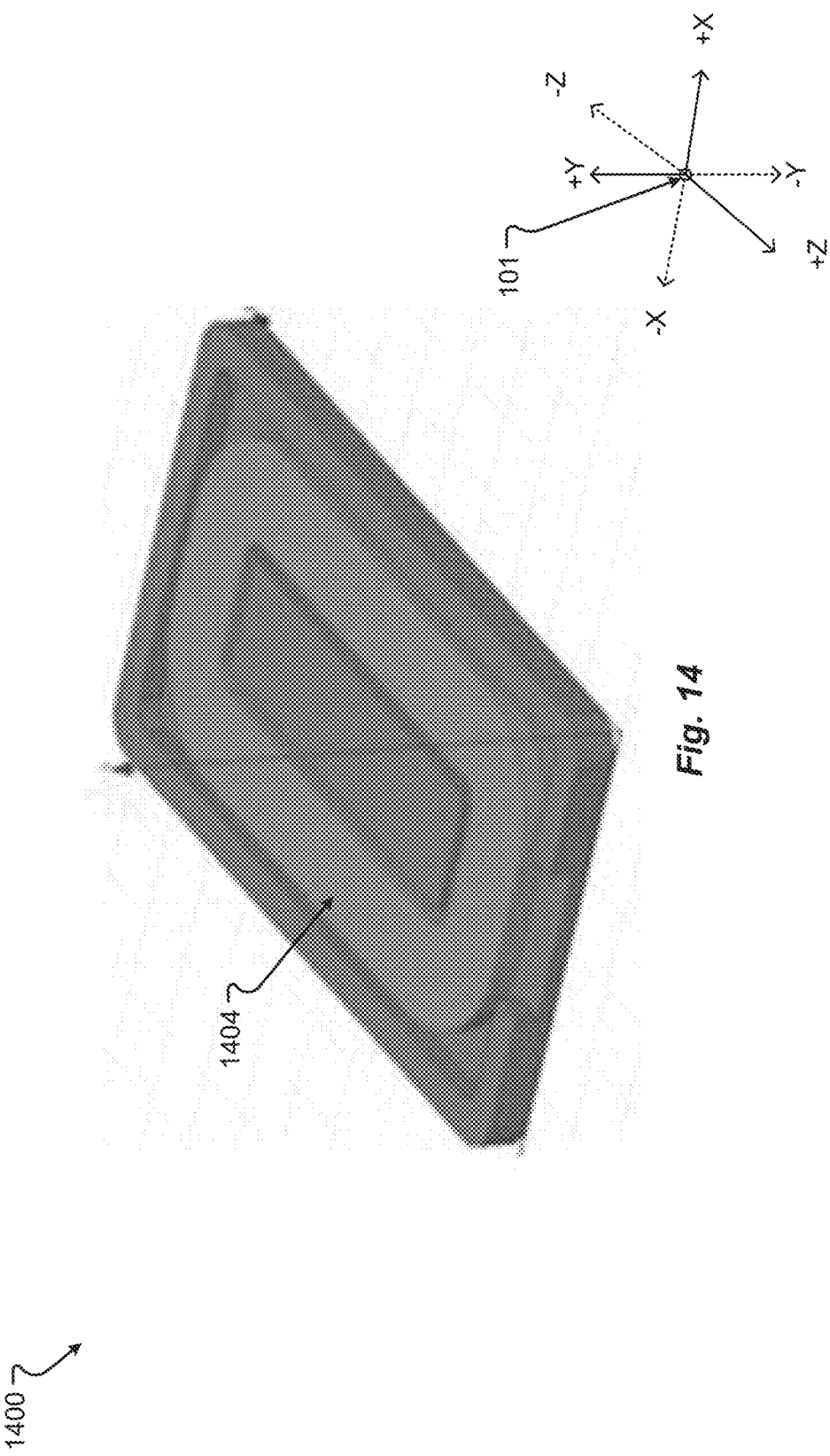

PLANAR ANTENNA

CROSS REFERENCE TO RELATED APPLICATIONS

This application is a continuation of and claims priority to U.S. patent application Ser. No. 16/290,568, filed on Mar. 1, 2019, which claims priority under 35 U.S.C. § 119 to Chinese Application No. 201810016135.5 filed on Jan. 8, 2018, the entire contents of each of which are hereby incorporated by reference.

FIELD

The present disclosure is generally directed to antennas and, in particular, toward planar antennas.

BACKGROUND

Mobile devices require a mobile power source, e.g., a battery, to function wirelessly. These batteries require periodic charging to refresh the power supply. There has been a shift to charge mobile devices wirelessly because wireless charge technology makes the user experience better. To charge a mobile device wirelessly, many mobile devices employ a planar antenna, which is an antenna in which most if not all of the elements are in one plane. Planar antennas reduce the amount of space needed for receiving the wireless charging signal.

Generally, the coil of the planar antenna is made of Litz (a type of specialized multi-strand wire or cable used in electronics to carry alternating current (AC) at radio frequencies) or solid wire. In some other designs, printed circuit board (PCB) coil has been utilized because of the PCB coil's thinness, high durability, consistent performance, and precise geometry. Some other planar coils (e.g., stamping coil, Flexible Printed Circuit (FPC) coil, etc.) have also been adopted because of those coil's thinness and low cost.

While these technologies are promising, improper planar coil design will cause large coil loss, high temperature rise, and reduce system efficiency, which needs to be avoided. Current planar antennas use flat shielding and strong magnetic strength that is perpendicular to planar coil's conductor, which design can cause huge coil loss. Further, improper conductor alignment causes circulating current in parallel conductors, which can also cause large coil loss.

BRIEF DESCRIPTION OF THE DRAWINGS

FIG. 2B is a perspective view of a high-permeability object in accordance with embodiments of the present disclosure;

FIG. 2C is another perspective view of a high-permeability object in accordance with embodiments of the present disclosure;

FIG. 10 is another cross-sectional view of a planar antenna in accordance with embodiments of the present disclosure;

FIG. 11 is another cross-sectional view of a planar antenna in accordance with embodiments of the present disclosure;

FIG. 12 is a graph depicting losses in the planar antenna configurations in accordance with embodiments of the present disclosure;

FIG. 13 is another cross-sectional view of a planar antenna in accordance with embodiments of the present disclosure; and FIG. 14 is another perspective view of a planar antenna in accordance with embodiments of the present disclosure.

DETAILED DESCRIPTION

It is with respect to the above issues and other problems that the embodiments presented herein were contemplated. In general, embodiments of the present disclosure provide a planar antenna. The planar antenna can have one or more high permeability objects that are added near the planar coil's tips. The planar antenna has a restricted conductor arrangement, where there are a maximum number of turns arranged in any horizontal layer. A turn's conductor could be a single conductor or could be two (2) or more conductors arranged in parallel.

Figure 1A:
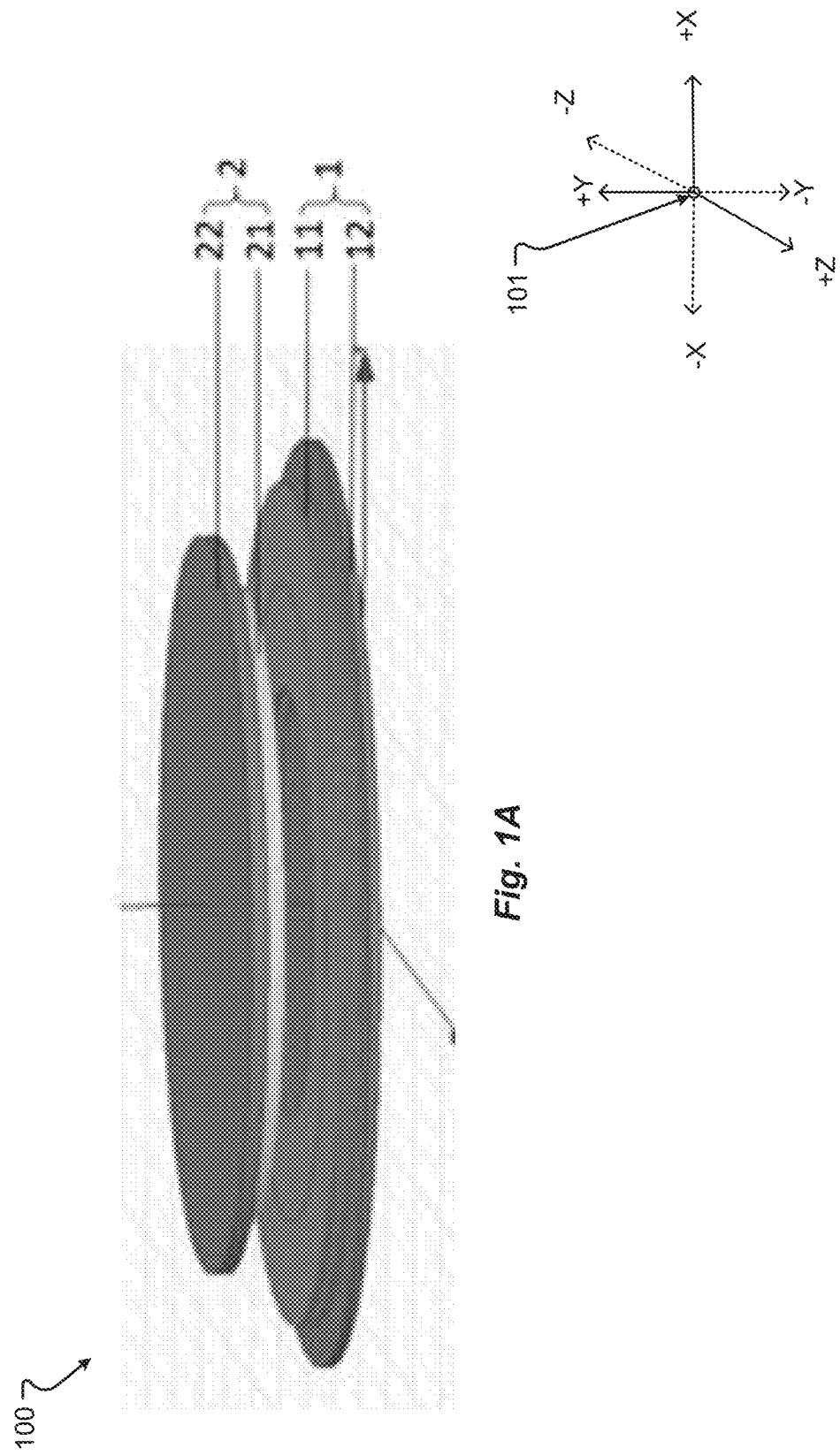
FIG. 1A is a perspective view of a planar antenna in accordance with embodiments of the present disclosure.

FIG. 1A shows a perspective view of an antenna pair 100 including a transmitter antenna 1 and a receiver antenna 2. The transmitter antenna 1 can include a transmitter antennal planar coil 11 and transmitter antenna shielding 12. Similarly, the receiver antenna 2 can include receiver antennal planar coil 21 and a receiver antenna shielding 22. The planar antennas 1, 2 will be explained with reference to the coordinate system 101.

To provide power to the receiver antenna 2, the transmitter antenna 1 and receiver antenna 2 are placed within physical proximity with the receiver antenna 2 placed above or over the transmitter antenna 1 in the "Y" direction. A magnetic field generated by the transmitter antenna 1 can induce a current in the receiver antenna 2. The current may then power the mobile device and/or charge a battery in the mobile device.

Figure 1B:
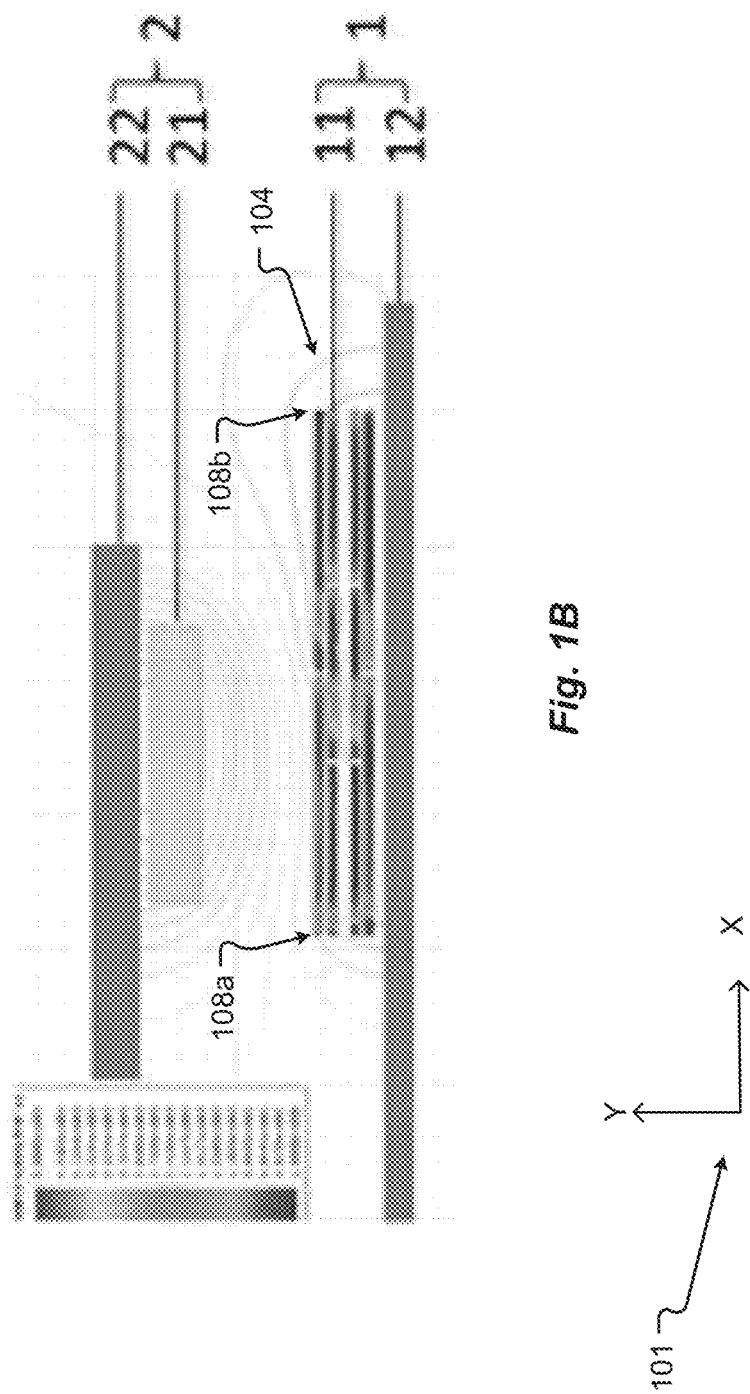
FIG. 1B is a cross-sectional view of a planar antenna in accordance with embodiments of the present disclosure.

A cross section of the transmitter antenna 1 and receiver antenna 2, in the XY-plane of FIG. 1A, may be as shown in FIG. 1B. The curved lines 104, in air, represent the magnetic strength H of the magnetic field generated by the transmitter. Planar coils can be subjected to a changing magnetic field, and, during charging, some of the power that would ideally be transferred through the planar coil is lost in the coil or core. These losses may be dissipated as heat and sometimes noise. The colors in the conductor 11 represents the loss density (the amount of loss in that area) in the conductor 11.

At planar coil's tip (edge) 108a, 108b, the magnetic strength H 104 is perpendicular (in the Y direction) to conductors 11. The magnetic strength H at the tips 108 can cause large eddy current losses in planar conductors, which is referred to as tip loss. As shown in FIG. 1B, there are large tip losses at the tips 108 of the antenna 1, which represents large loss density.

Figure 2A:
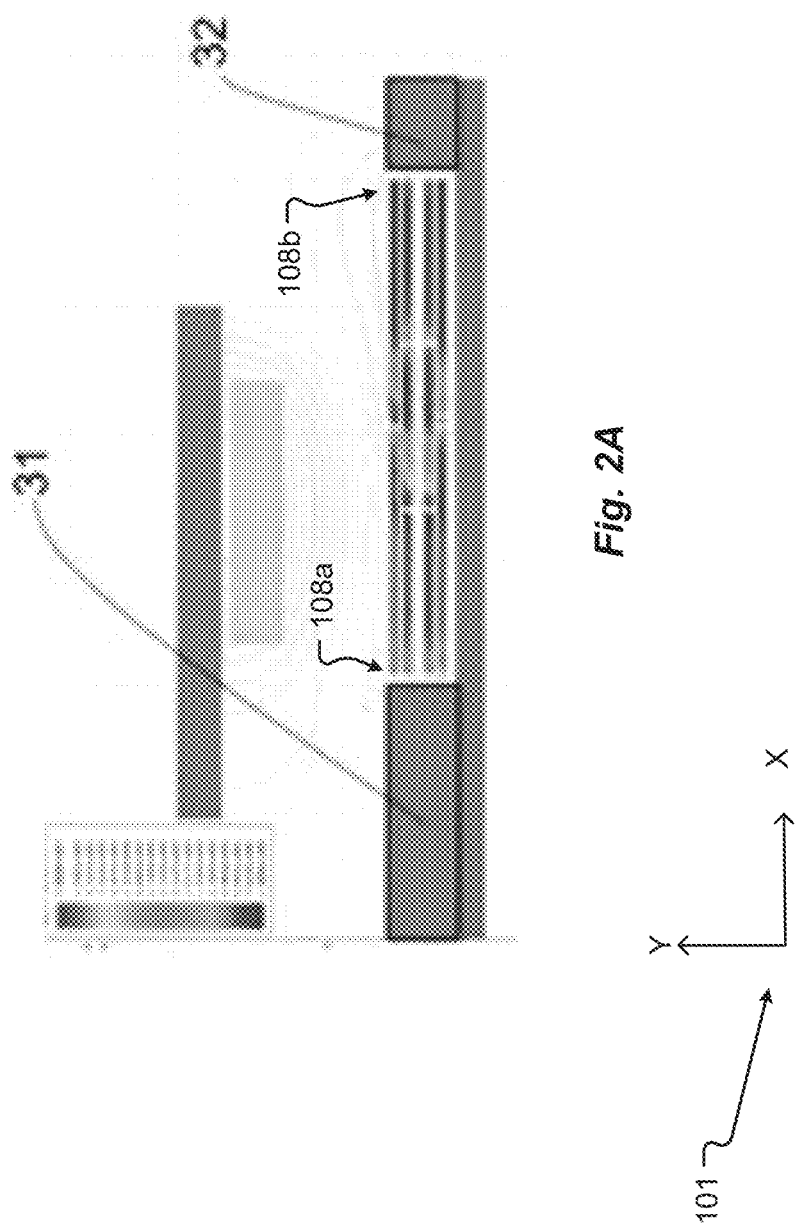
FIG. 2A is another cross-sectional view of a planar antenna in accordance with embodiments of the present disclosure.

Referring now to FIG. 2A, to reduce tip loss, high magnetic permeability objects 31, 32 can be placed in proximity to the coil's tip 108. The high magnetic permeability objects 31, 32 can be made from ferrous or other materials that have a high magnetic permeability, for example, silicon steel, ferrite, soft iron, mu-metal, permalloy, supermalloy, Sendust, amorphous metal, Metglas, etc. As shown in FIG. 2A, the tip loss is reduced as evidenced by the reduction of loss density at tips 108a.

A perspective view of the planar antenna 12 may be as sown in FIG. 2B. As shown in FIG. 2B, the high permeability objects 31, 32 extend from the shielding 12 upward in the Y direction. The high permeability object 31 is positioned in an interior of the antenna 1, and the coil 11 encircles this high permeability object. The second high permeability object 32 is positioned at an exterior of the antenna 1, and the coil 11 is encircled by this high permeability object 32. The magnetic resistance of the high permeability objects 31, 32 is low, which can reduce the magnetic strength H perpendicular to conductor 11.

In some configurations, the high permeability objects 31, 32 can be made of the same material as the flat shielding 12, and can be formed with shielding 12 as a single piece. In other configurations, the high permeability objects 31, 32 may be made from a material different from the flat shield 12, which may necessitate the high permeability objects 31, 32 be coupled to the flat shielding 12. Coupling can include any type of attachment method including mechanical attachment, fusing, welding, and/or adhering the high permeability objects 31, 32 to the flat shielding 12 with an adhesive or a paint that includes an adhesive mixed with magnetic powder that is deposited on coil's tips 108.

As shown in FIG. 2b, there could be two high permeability objects 31, 32 at each tip of coil 108a, 108b. In some configurations, the outside high permeability object 32 could have one or more openings or breaches (not shown). Further, in some configurations, there could be one high permeability object 31 or 32 at one tip of coil 108a or 108b. As shown in FIG. 2C, to connect the coil 11 and other components conveniently, the high permeability object 31 can be arranged in the center of the shielding 12. The permeability of the high permeability object 31 should be higher than the permeability of air. The high permeability objects 31, 32 also increases the coupling coefficient of antenna 11, which increase wireless power transfer efficiency.

Figure 3:
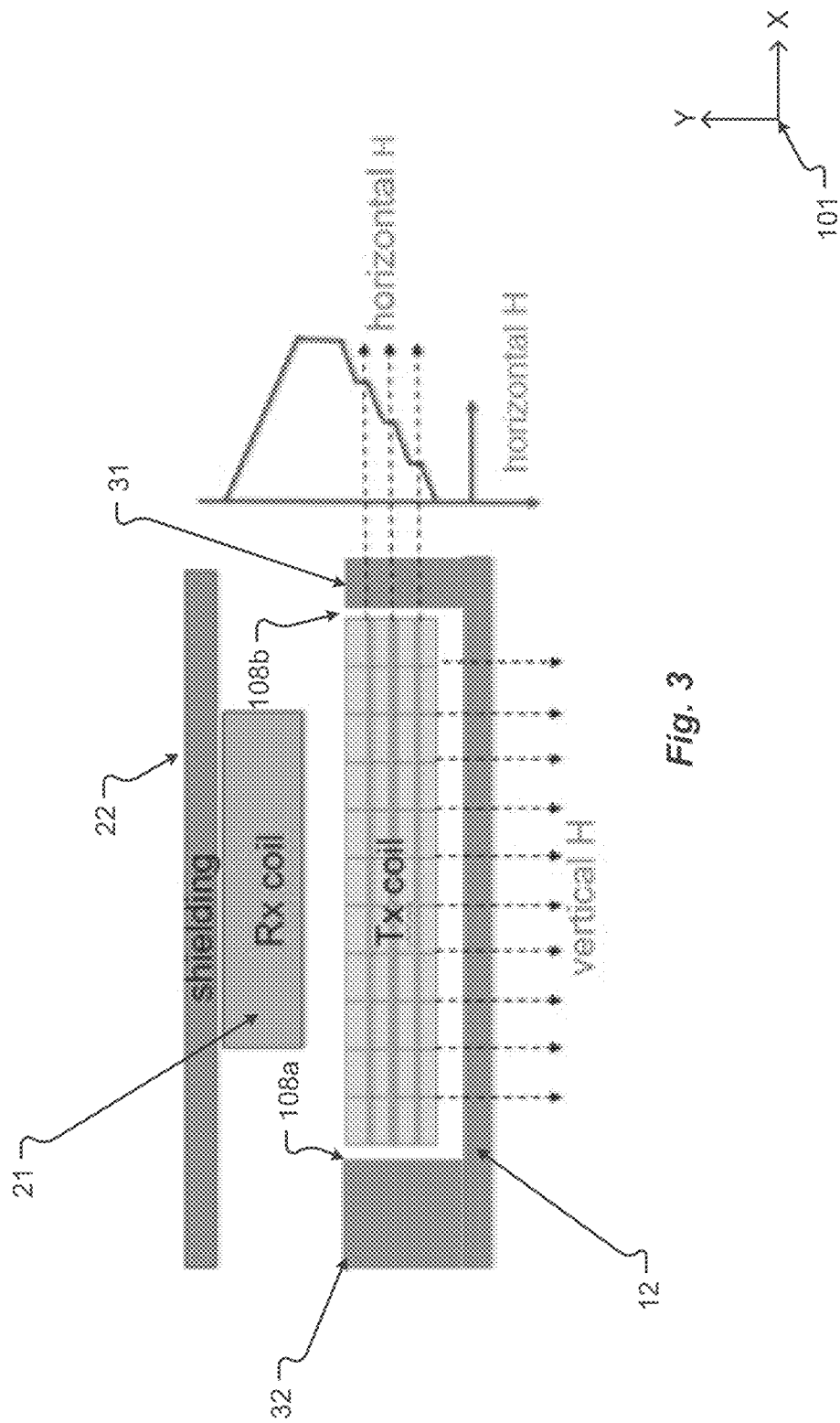
FIG. 3 is another cross-sectional view of a planar antenna in accordance with embodiments of the present disclosure.

Referring now to FIG. 3, the high permeability objects 31, 32, near conductor's tips 108a, 108b reduce the vertical magnetic strength H and maintains the horizontal magnetic strength H, which causes the horizontal H to be large and vertical H to be small. Horizontal H is between the layers of the coil 11; vertical H is between conductors in same layer. The planar coil 11 can contains one or more layers in the Y-direction, for example, there may be two, four, or eight layers. As an example, a four-layer PCB, as shown in FIG. 3, and according to Ampere circuital theorem, has a horizontal H value in every layer is shown at the right of FIG. 3.

The planar coil 11 can contain multiple layers, with the conductors in the coil 11 arranged in parallel to decrease direct current (DC) resistance. Generally, the current in every parallel conductor is not equal. This difference in current is called a circulation current. Current unbalance will also cause large coil loss.

According to Wireless Power Consortium's (WPC) technology specification, a transmitter antenna coil should include 10 turns. When considering the coil's cost and DC resistance for a 10-turn coil, a two-layer PCB can be utilized. In general, to maintain the same DC resistance over the various conductors, the conductors 404a, 404b, 404c, 404d, 404e, 404f, 404g, 404h, 404i, and/or 404j can be placed in series as shown as FIG. 4. Further, the conductors in the one "box" are in parallel in the Y-direction. Every "box" represents a single turn of the conductor 404, and the conductors 404 in each box are electrically connected in parallel.

The number of conductors 404, for example, 10, represents a turn number. According to above analysis, when high permeability objects 31, 32 are placed near conductor's tips 108, there is horizontal H among these paralleled conductors 404. This conductor arrangement can cause large circulating current and coil loss.

Figure 5:
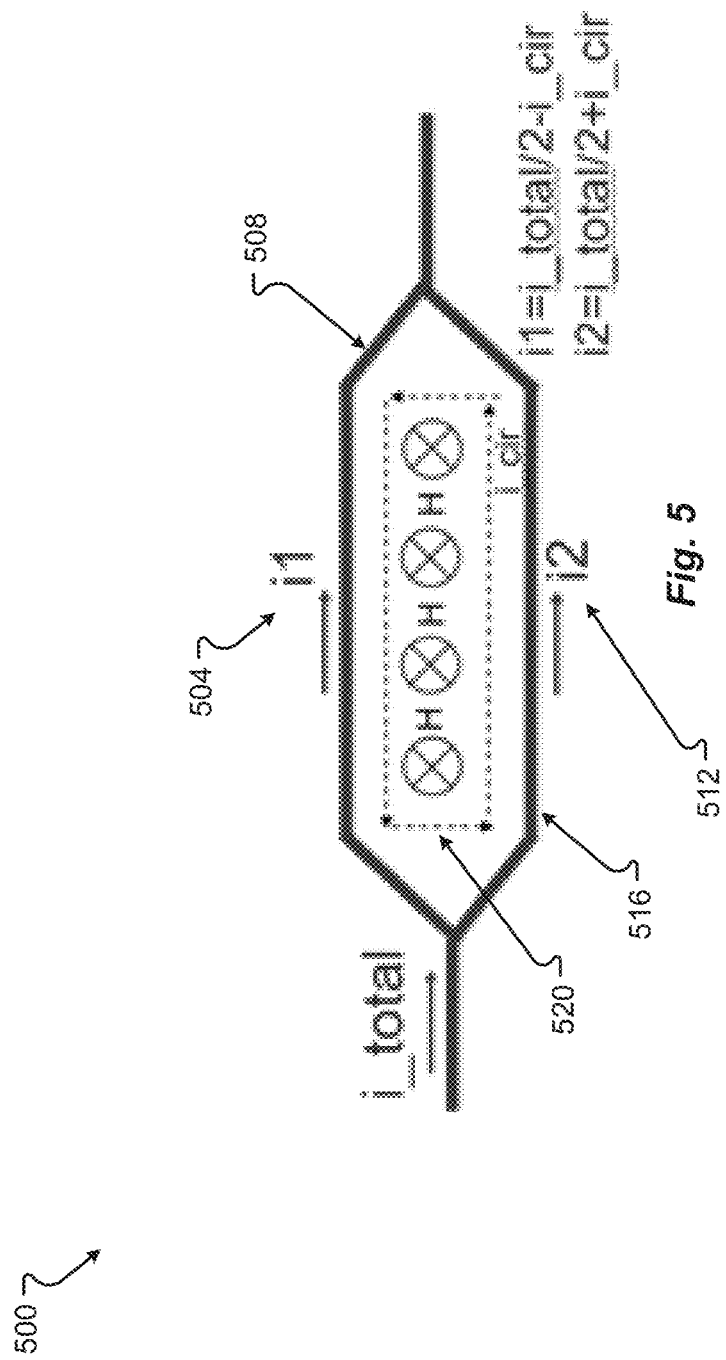
FIG. 5 is a circuit diagram for explaining circulating current in accordance with embodiments of the present disclosure.

FIG. 5 shows a visual diagram 500 for explained the theory of circulating current caused by the dynamic magnetic field. Current I1 504 is the current of branch 1 508, current i2 512 is current of branch 2 516. Branch 1 508 and branch 2 516 are in parallel. According to Faraday's law, dynamic magnetic strength in the loop of branch1 508 and branch2 512 induces a circulating current $i_{cir}$ 520 within the loop.

Figure 6:
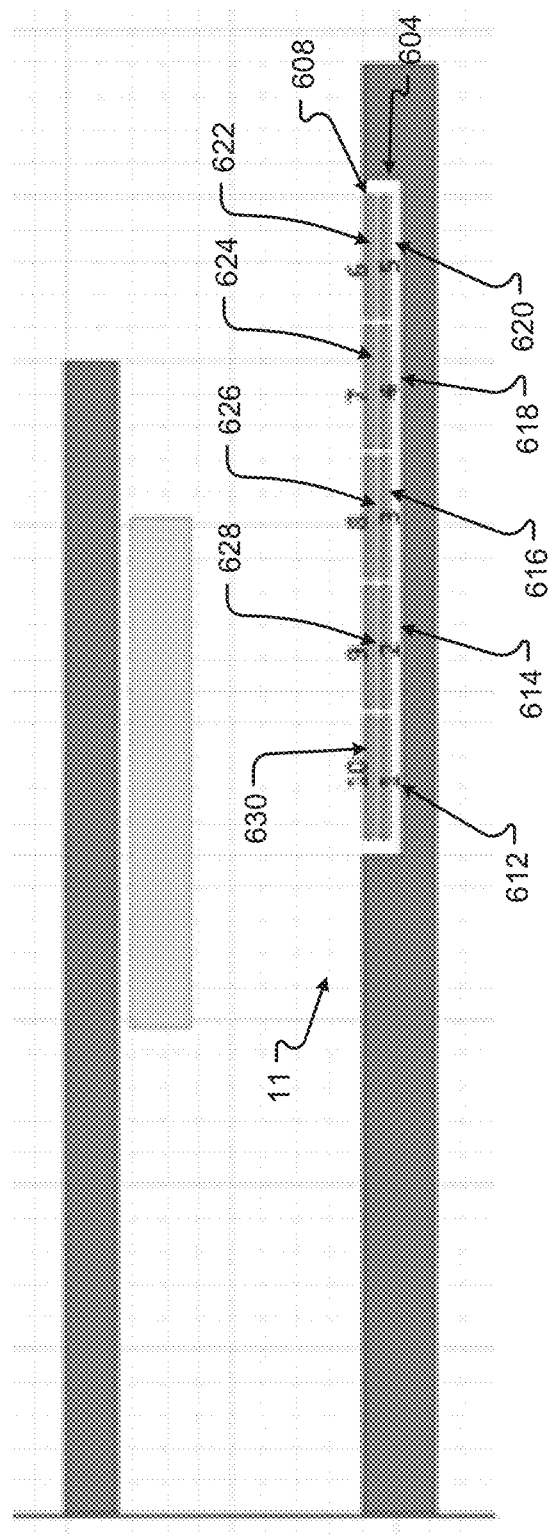
FIG. 6 is another cross-sectional view of a planar antenna in accordance with embodiments of the present disclosure.
Figure 7:
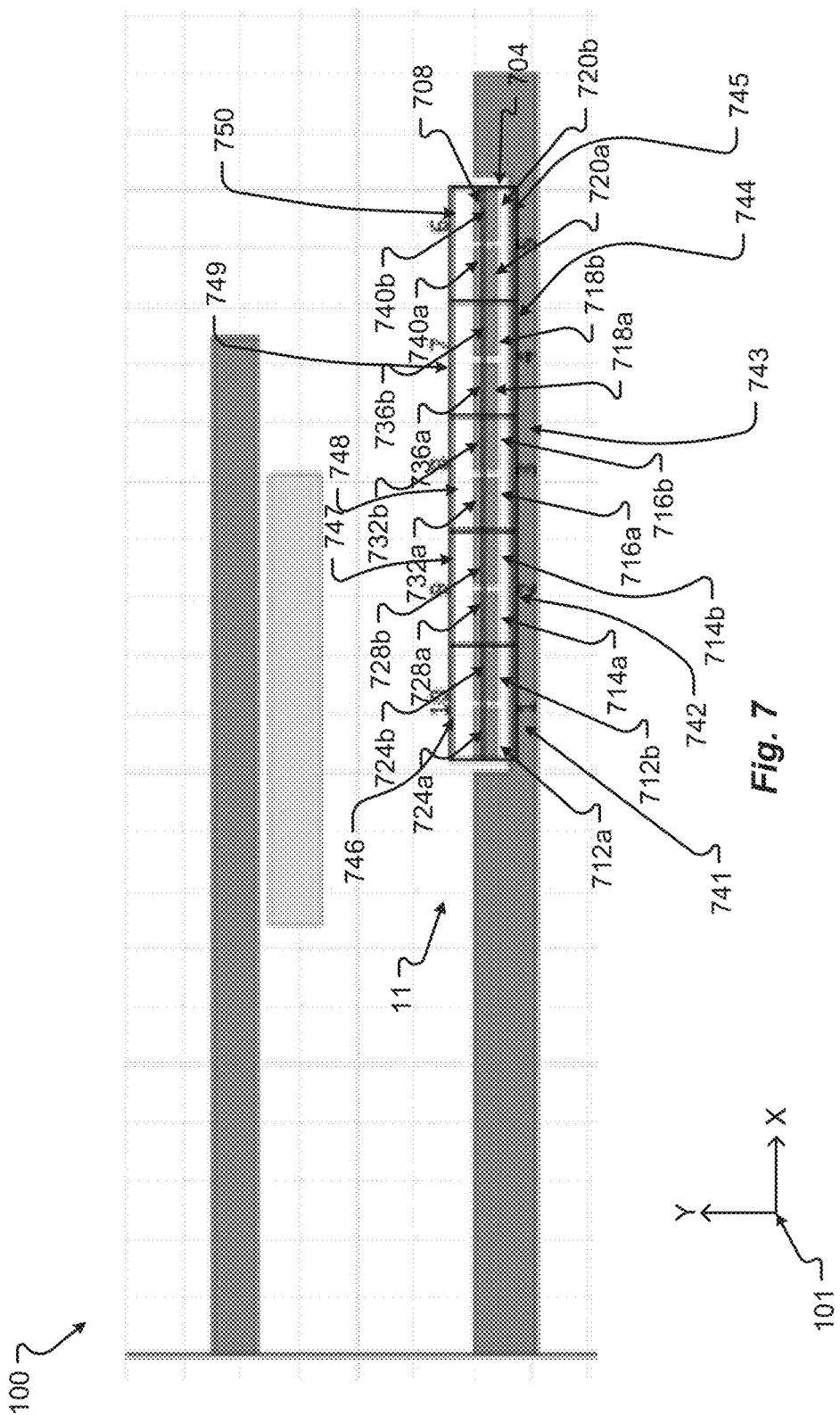
FIG. 7 is another cross-sectional view of a planar antenna in accordance with embodiments of the present disclosure.

As explained earlier, when high permeability objects 31, 32 are arranged near conductor's tip 108a, and/or among coil's conductors 108b, the horizontal H is large and vertical H is small. As shown in FIG. 6, the antenna 11 can have two layers 604, 608. The conductors 612, 614, 616, 618, and/or 620 are $1^{st}$~$5^{th}$ turns and can be arranged in layer 604, and conductors 622, 624, 626, 628 630 are $6^{th}$~$10^{th}$ turns and can be arranged in layer 608, as shown in FIG. 6. In other configurations, there may be two or more conductors arranged in parallel. For example, as shown in FIG. 7, conductors 712a, 712b in box 741 are in parallel. Similarly, conductors 714a, 714b in box 742, 716a and 716b in box 743, 718a and 718b in box 744, 720a and 720b in box 745, 724a and 724b in box 746, 728a and 728b in box 747, 732a and 732b in box 748, 736a and 736b in box 749, 740a and 740b in box 750 are also in parallel. Boxes 741-750 may represent a single turn and may be connected in series. Conductors in each "box" are in parallel.

Figure 8:
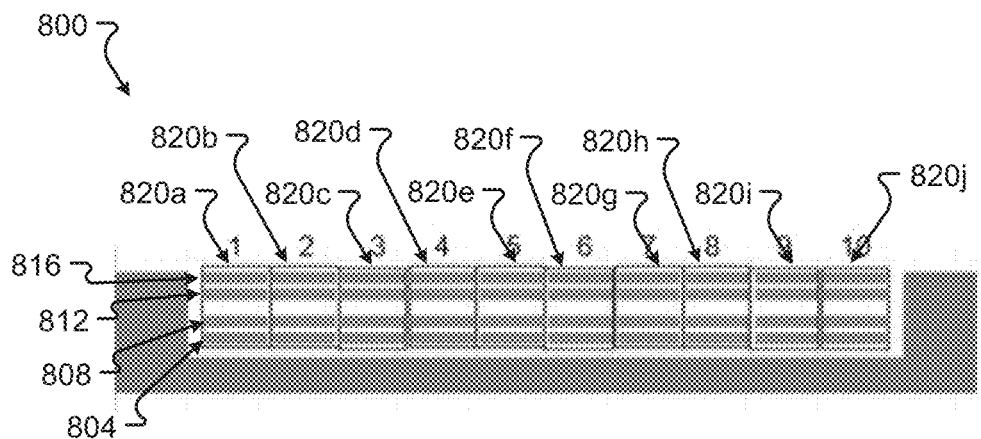
FIG. 8 is another cross-sectional view of a planar antenna in accordance with embodiments of the present disclosure.
Figure 9:
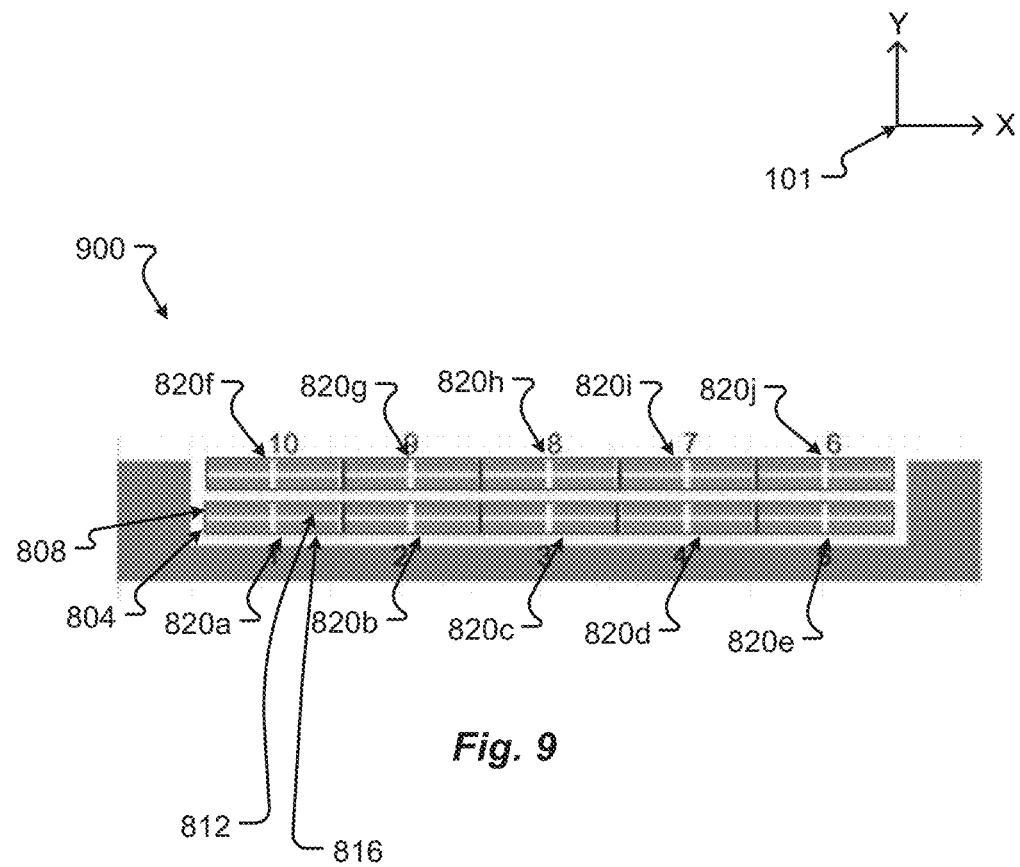
FIG. 9 is another cross-sectional view of a planar antenna in accordance with embodiments of the present disclosure.

To decrease DC loss in the coil, more layers, e.g., layers 704, 708, can be arranged in the planar antenna 11. FIGS. 8 and 9 show embodiments of a four-layer PCB coil. As shown in FIG. 8, four conductors 804, 808, 812, and 816, in one box 820a, are in parallel. In FIG. 9, the conductors 804-816 are also in parallel, but arranged in a different configuration. Every box 820a-820j represents a single turn and may be connected in series. Although parallel conductors 804-816 have good DC resistance balance in these 2 patterns, shown in FIG. 8 or 9, large circulating current induced by the dynamic magnetic strength can still cause large coil loss.

Other configurations of the antenna 1000, 1100 may be as shown in FIGS. 10 and 11. In the configurations 1000, 1100, the coil still has 10 turns. Conductors 804, 808, 812 and 816 in "box" 820a are paralleled and arranged in a same horizontal PCB layer. The conductors in "box" 820c are paralleled and arranged in two horizontal PCB layers. Thus, the coil 1000 is arranged in four layers, with an average 2.5 turns in any one layer.

As shown in FIGS. 10 and 11, there can be three or less turns conductors in any one horizontal layer. Conductors in one box 820 are in parallel. Every box represents one turn and is connected in series. The number of boxes represents the turn number.

FIG. 12 shows a graph 1200 that compares the coil loss of turn configurations shown in FIGS. 8 through 11. As shown in graph 1200, configurations 1000 and 1100 have a lower coil loss than the arrangements 800, 900 in FIG. 8 and FIG. 9.

To determine the most turns number that can be arranged in one horizontal layer, the term ceiling function ("ceil"), means rounding towards ceiling, is used. In the equation, turns number is represented by "m," and layer number is represented by "n." The below expression determines the most turns number that can be arranged in any horizontal layer is:

$$\mathrm{ceil}\left(\frac{m}{n}\right)$$

For example, when turns number m is 10, the layer number n is 4, m/n=2.5, ceil (2.5) is equal to 3. So the most turns number that can be arranged in one horizontal layer is 3. In FIG. 10, each horizontal layer has 2.5 turns. In FIG. 11, configuration 1100 has a first layer with 2 turns, a second layer with 3 turns, a third layer with 3 turns, and a fourth layer with 2 turns. In the configuration 1300 of FIG. 13, there are 3, 2, 2, 3 turns in the $1^{st}$, $2^{nd}$, $3^{rd}$, and $4^{th}$ layers, respectively. The pattern for the turns can be arranged in various other patterns, for example, 3, 2, 3, 2; 2, 3, 2, 3; turns in the $1^{st}$, $2^{nd}$, $3^{rd}$, and $4^{th}$ layers, respectively.

Figure 4:
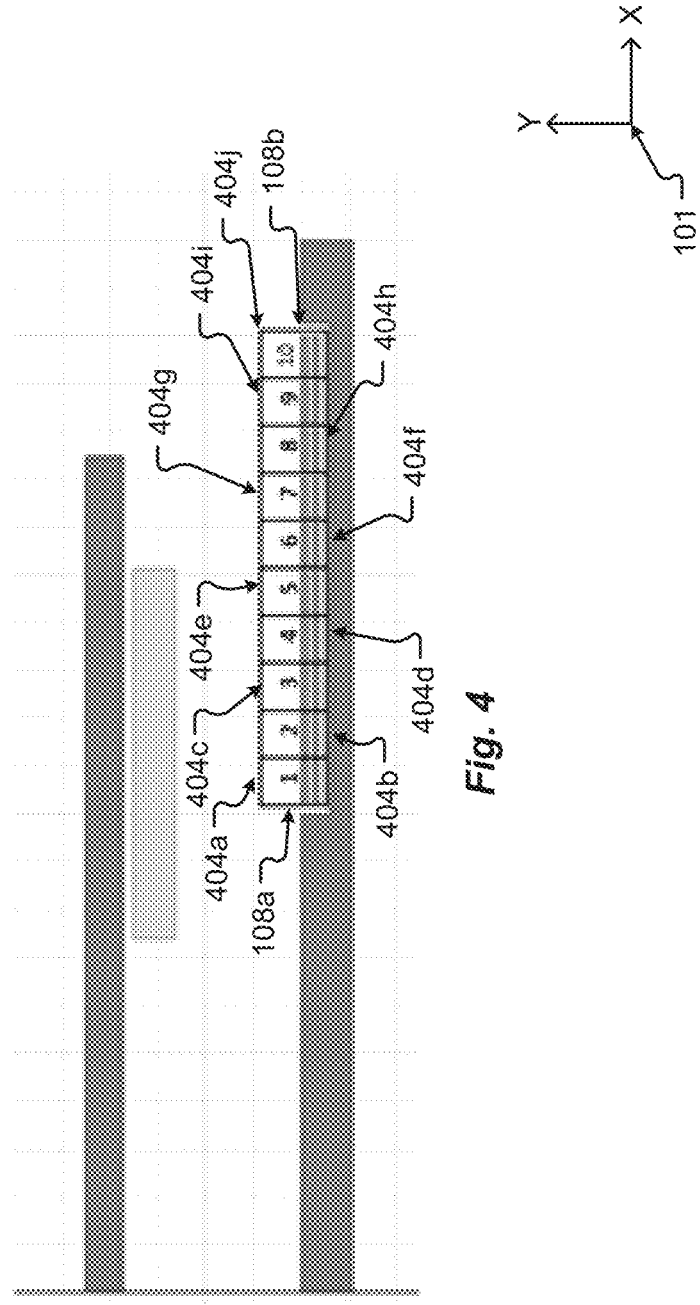
FIG. 4 is another cross-sectional view of a planar antenna in accordance with embodiments of the present disclosure.

A perspective view of the planar antenna 1400 may be as shown in FIG. 14. As shown in FIG. 4, the planar antenna 1400 can have different shapes, for example, rectangle, circular, oval, racetrack-shaped, etc. FIG. 14 shows a rectangle shape antenna 1404 from the top view.

The antenna described herein can be a transmitter antenna or/and a receiver antenna. Regardless, the antenna can have a high permeability object placed at or near the planar coil's tips. Further, every turn's conductor can be arranged in same horizontal layer. Still further, one turn's coil could be one conductor or two or more parallel conductors. The ceiling function above can define the most turns possible in a layer.

The high permeability objects reduce vertical magnetic strength H, which cause large eddy current losses, and can maximize H in the horizontal direction. One turn's conductor is arranged in same horizontal layer, because H among conductors in same horizontal H is low. This arrangement will not cause large circulating current and coil loss.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a planar antenna, comprising: a coil comprising: a first turn in a first layer; a first tip; a first high permeability object positioned in proximity to the first tip.

Any of the one or more above aspects, wherein the coil further comprises a second layer.

Any of the one or more above aspects, wherein the first layer includes a second turn.

Any of the one or more above aspects, wherein the coil comprising a second tip opposite the first tip.

Any of the one or more above aspects, further comprising a second high permeability object positioned in proximity to the second tip.

Any of the one or more above aspects, wherein the first turn includes two or more conductors.

Any of the one or more above aspects, wherein the two or more conductors are arranged in parallel.

Any of the one or more above aspects, wherein the first layer includes fewer turns than the second layer.

Any of the one or more above aspects, wherein the second layer has fewer turns than the first layer.

Any of the one or more above aspects, wherein the first layer and the second layer has three or fewer turns.

Any of the one or more above aspects, wherein the first high permeability object is made from one or more of ferrite, silicon-steel, amorphous steel, and/or soft steel.

Any of the one or more above aspects, wherein the planar antenna is of rectangular shape.

Any of the one or more above aspects, wherein a maximum number of turns in any layer is determined by the ceiling function: ceil(m/n).

Embodiments of the present disclosure include a coil of a planar antenna, comprising: a first layer, the first layer comprising: a first turn; a second turn; a second layer, the second layer comprising: a third turn; and a fourth turn.

Any of the one or more above aspects, wherein the second layer includes a fifth turn.

Any of the one or more above aspects, wherein the second layer and the first layer have a different number of turns.

Any of the one or more above aspects, further comprising: a third layer; and a fourth layer.

Any of the one or more above aspects, wherein the first turn includes two or more conductors, wherein the two or more conductors are arranged in parallel.

Any of the one or more above aspects, wherein the planar antenna is of rectangular shape.

Any of the one or more above aspects, wherein a maximum number of turns in any layer is determined by the ceiling function: ceil(m/n).

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The terms "determine," "calculate," "compute," and variations thereof, as used herein, are used interchangeably and include any type of methodology, process, mathematical operation or technique.

What is claimed is:

1. A planar antenna, comprising:
a coil, comprising:
a first turn in a first layer; and
a first tip; and
a first high permeability object positioned in proximity to the first tip, wherein the first high permeability object includes a first section, a second section, and a third section between the first section and the second section, wherein the third section is recessed from the first section and the second section and accommodates the coil, wherein the first section surrounds the coil, wherein the second section is surrounded by the coil, and wherein the second section comprises an uninterrupted top surface that spans over an entire top of the second section.

2. The planar antenna of claim 1, wherein the coil further comprises a second layer.

3. The planar antenna of claim 2, wherein the first layer includes a second turn.

4. The planar antenna of claim 3, wherein the second turn includes two or more conductors electrically connected in parallel and in a same plane within the first layer.

5. The planar antenna of claim 1, wherein the coil includes a void at a center of the coil.

6. The planar antenna of claim 5, wherein the second section occupies the void.

7. The planar antenna of claim 2, wherein the first turn includes two or more conductors electrically connected in parallel and in a same plane within the first layer.

8. The planar antenna of claim 2, wherein the first layer includes fewer turns than the second layer.

9. The planar antenna of claim 2, wherein the second layer has fewer turns than the first layer.

10. The planar antenna of claim 2, wherein each of the first layer and the second layer has three or fewer turns.

11. The planar antenna of claim 1, wherein the first high permeability object is made from one or more of ferrite, silicon-steel, amorphous steel, and/or soft steel.

12. The planar antenna of claim 11, wherein the planar antenna is a rectangular shape.

13. The planar antenna of claim 12, wherein a maximum number of turns in the first layer is determined by the ceiling function:

$$\text{ceil} = \left(\frac{m}{n}\right),$$

where m represents a total number of turns and n represents a total number of layers.

14. The planar antenna of claim 1, wherein the first high permeability object is a single piece object comprising the first section, the second section, and the third section.

15. The planar antenna of claim 1, wherein the second section forms a cylinder shape that protrudes from the third section.

16. A planar antenna, comprising:
a coil, comprising:
a first layer, the first layer comprising:
a first turn, wherein the first turn includes two or more conductors, wherein the two or more conductors are electrically connected in parallel and are in a same plane within the first layer; and
a second turn; and
a second layer on the first layer, the second layer comprising:
a third turn; and
a fourth turn; and
a first high permeability object including a first section, a second section, and a third section between the first section and the second section, wherein the third section is recessed from the first section and the second section and accommodates the coil, wherein the first section surrounds the coil, wherein the second section is surrounded by the coil, wherein the second section comprises an uninterrupted top surface that spans over an entire top of the second section, and wherein a maximum number of turns in any layer is determined by the ceiling function:

$$\operatorname{ceil}\left(\frac{m}{n}\right),$$

where m represents a total number of turns and n represents a total number of layers.

17. The planar antenna of claim 16, wherein the second layer includes a fifth turn.

18. The planar antenna of claim 16, wherein the second layer and the first layer have a different number of turns.

19. The planar antenna of claim 16, wherein the coil further comprises:
a third layer; and
a fourth layer.

20. The planar antenna of claim 16, wherein the planar antenna is a rectangular shape.

* * * * *